「12」 United States Patent
Klopsch et al.

(10) Patent No.: US 8,741,988 B2
(45) Date of Patent: *Jun. 3, 2014

(54) USE OF CYCLIC CARBONATES IN EPOXY RESIN COMPOSITIONS

(75) Inventors: Rainer Klopsch, Worms (DE); Andreas Lanver, Mannheim (DE); Achim Kaffee, Lorsch (DE); Klaus Ebel, Lampertheim (DE); Miran Yu, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 214 days.

This patent is subject to a terminal disclaimer.

(21) Appl. No.: 13/158,841

(22) Filed: Jun. 13, 2011

(65) Prior Publication Data

US 2011/0306702 A1 Dec. 15, 2011

Related U.S. Application Data

(60) Provisional application No. 61/354,751, filed on Jun. 15, 2010.

(51) Int. Cl.
*C08L 63/00* (2006.01)
*C08G 59/00* (2006.01)

(52) U.S. Cl.
CPC ............... *C08L 63/00* (2013.01); *C08G 59/00* (2013.01)
USPC .................... 523/400; 525/529; 528/116

(58) Field of Classification Search
CPC ................. C08L 63/00; C08G 59/00
USPC ............... 523/400; 525/524, 529; 528/116
See application file for complete search history.

(56) References Cited

U.S. PATENT DOCUMENTS

| 4,874,899 | A * | 10/1989 | Hoelderich et al. | 568/386 |
| 5,132,458 | A * | 7/1992 | Honel et al. | 564/367 |
| 2004/0044229 | A1* | 3/2004 | Hembre et al. | 549/229 |
| 2005/0113594 | A1* | 5/2005 | Van Holen | 558/276 |
| 2007/0151666 | A1* | 7/2007 | Moeller et al. | 156/327 |
| 2008/0299395 | A1* | 12/2008 | Strange et al. | 428/409 |
| 2009/0269677 | A1* | 10/2009 | Hirose et al. | 429/338 |
| 2010/0160494 | A1* | 6/2010 | Yonehama et al. | 523/400 |

FOREIGN PATENT DOCUMENTS

DE 1 178 598 9/1964
WO WO 2008/143247 A1 * 11/2008

OTHER PUBLICATIONS

U.S. Appl. No. 13/491,074, filed Jun. 7, 2012, Henningsen, et al.
John W. Muskopf et al., "Epoxy Resins", Ullmann's Encyclopedia of Industrial Chemistry, 5th edition, 1997, 36 pages.
Bungo Ochiai et al., "Synthesis and Crosslinking of Oligo (carbonate-ketone) Obtained by Radical Polymerization of 4-methylene-5,5-dimethyl-1,3-dioxolan-2-one", Nettowaku Porima vol. 26, No. 3, 2005, 7 pages.
U.S. Appl. No. 13/039,109, filed Mar. 2, 2011, Sutter, et al.
U.S. Appl. No. 13/773,028, filed Feb. 21, 2013, Gehringer, et al.
U.S. Appl. No. 13/853,552, filed Mar. 29, 2013, Porta Garcia, et al.

* cited by examiner

*Primary Examiner* — Randy Gulakowski
*Assistant Examiner* — Ha Nguyen
(74) *Attorney, Agent, or Firm* — Oblon, Spivak, McClelland, Maier & Neustadt, L.L.P.

(57) ABSTRACT

The present invention relates to the use of cyclic carbonates of the formula I or a mixture thereof in epoxy resin compositions and also to epoxy resin compositions which comprise such cyclic carbonates.

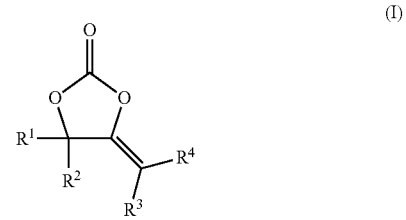

(I)

in which
$R^1$ and $R^2$ independently of each other are hydrogen, $C_1$-$C_6$-alkyl, $C_1$-$C_4$-alkoxy-$C_1$-$C_4$-alkyl, $C_5$-$C_6$-cycloalkyl, phenyl, phenyl-$C_1$-$C_4$-alkyl, $C_2$-$C_6$-alkenyl or $C_2$-$C_6$-alkynyl, or $R^1$ and $R^2$ together are a $C_3$-$C_{11}$-alkylene group;
$R^3$ and $R^4$ independently of each other are hydrogen, $C_1$-$C_6$-alkyl, $C_1$-$C_4$-alkoxy-$C_1$-$C_4$-alkyl, $C_5$-$C_6$-cycloalkyl, phenyl, phenyl-$C_1$-$C_4$-alkyl, $C_2$-$C_6$-alkenyl or $C_2$-$C_6$-alkynyl, or $R^3$ and $R^4$ together are a $C_4$-$C_6$-alkylene group;
or mixtures thereof, as additives in epoxy resin compositions.

22 Claims, No Drawings

USE OF CYCLIC CARBONATES IN EPOXY RESIN COMPOSITIONS

The present invention relates to the use of cyclic carbonates or a mixture thereof in epoxy resin compositions and also to epoxy resin compositions which comprise such cyclic carbonates.

Epoxy resins is a customary designation for oligomeric compounds having on average more than one epoxide group per molecule which are converted into thermosets by reaction of suitable hardeners or by polymerization of the epoxide groups. Cured epoxy resins are widespread on account of their outstanding mechanical and chemical properties, such as high impact strength, high abrasion resistance, good chemical resistance, more particularly a high resistance toward alkalis, acids, oils, and organic solvents, high weathering resistance, excellent adhesiveness to a large number of materials, and high electrical insulation capacity. They serve as a matrix for fiber composites and are often a major constituent in electrical laminates, structural adhesives, casting resins, and powder coatings. The majority of commercial uncured epoxy resins are prepared by coupling epichlorohydrin to compounds which posses at least two reactive hydrogen atoms, such as polyphenols, monoamines and diamines, aminophenols, heterocyclic imides and amides, aliphatic diols or polyols, or dimeric fatty acids. Epoxy resins which derive from epichlorohydrin are referred to as glycidyl-based resins.

Reaction with hardeners converts the epoxy resin prepolymer into infusible, three-dimensionally "cross-linked", thermoset materials. With regard to the curing of epoxy resins, a distinction is made between two types of cure. In the first case, at least one compound having at least two functional groups which are able to react with the oxirane groups and/or hydroxyl groups of the epoxy resin prepolymers to form covalent bonds, i.e., a hardener, is incorporated into the epoxy resin composition. On curing, a polymeric network is then formed from epoxy resin prepolymers and hardener molecules that are linked covalently to one another, the degree of crosslinking being controllable via the relative amounts of the functional groups in the hardener and in the prepolymer. In the second case, a compound is used which brings about the homopolymerization of the epoxy resin prepolymers with one another. Such compounds are often referred to as initiators or accelerators. Initiators and accelerators are in some cases also used together with hardeners in order to accelerate the crosslinking.

Examples of suitable functional groups which are able to enter into a condensation reaction with the oxirane groups of the epoxy resins include amino groups, hydroxyl groups, and carboxyl groups or derivatives thereof, such as anhydrides. Accordingly, hardeners typically used for epoxy resins include aliphatic and aromatic polyamines, carboxylic anhydrides, polyamidoamines, amino resins or phenolic resins. Known hardeners possess a structure which is linear or has no more than a low degree of crosslinking. They are described, for example, in Ullmann's Encyclopedia of Industrial Chemistry, 5th edition on CD-ROM, 1997, Wiley-VCH, in the chapter "Epoxy Resins", hereby fully incorporated by reference.

The prepolymers used for preparing cured epoxy resins typically have a high viscosity, which is a hindrance to the application. Moreover, the high viscosity of the resins frequently limits the use of fillers, such use being desirable for the purpose of modifying the mechanical properties of the cured resin composition. In many cases, moreover, the use of fillers allows a reduction to be achieved in the costs of the products manufactured from the resins, such as moldings or coatings, for example. For this reason it is common to add diluents to the uncured epoxy resin, these diluents lowering the viscosity of the resin to the level that is desired for the application.

Among the diluents, a distinction is made between conventional diluents and reactive diluents. Conventional diluents are commonly organic solvents, examples being ketones such as acetone, methyl ethyl ketone, cyclohexanone and the like, esters of aliphatic carboxylic acids such as ethyl acetate, propyl acetate and butyl acetate, aromatic hydrocarbons such as toluene or xylenes, for example, and also alkanols such as methanol, ethanol, n- and isopropanol, butanols and the like. In the course of the curing of the epoxy resin, they evaporate from the resin composition. This frequently results in an unwanted reduction in volume of the resin (shrinking) or in the formation of pores, which impacts typically deleteriously on the mechanical properties of the cured material, such as the fracture resistance, for example, but also on the surface properties.

The disadvantages of the conventional solvents can be circumvented to some extent through the use of reactive diluents. Similarly to solvents, reactive diluents are substances of low molecular mass, but differ from conventional solvents in having functional groups, generally oxirane groups, which are able to react with the epoxide groups of the resin and/or with the functional groups of the hardener, to form covalent bonds. Reactive diluents likewise lower the viscosity of the epoxy resin. They do not evaporate in the course of curing, and therefore, in the course of curing, are incorporated covalently into the resin matrix as it forms. The reactive diluents that are suitable for epoxy resins are typically monofunctional or polyfunctional oxiranes. Examples of monofunctional reactive diluents are, for example, glycidyl ethers of aliphatic and cycloaliphatic monohydroxy compounds having in general 2 to 20 C atoms, such as ethylhexyl glycidyl ether, for example, and also glycidyl esters of aliphatic or cycloaliphatic monocarboxylic acids having in general 2 to 20 C atoms. Examples of polyfunctional reactive diluents are, in particular, glycidyl ethers of polyfunctional alcohols having in general 2 to 20 C atoms, and having on average, commonly, 1.5 to 4 glycidyl groups, such as 1,4-butanediol diglycidyl ether, 1,6-hexanediol diglycidyl ether, diethylene glycol diglycidyl ether or the glycidyl ether of trimethylolpropane. Reactive diluents described to date do improve the viscosity properties of the epoxy resin compositions. In many cases, however, they are detrimental to the hardness of the cured resin, and result in a poorer solvent resistance. It is known, furthermore, that the reactive diluents reduce the reactivity of epoxy resin compositions formulated using them, resulting in longer cure times.

In the prior art, variously substituted 4-methylene-1,3-dioxolan-2-ones have been described as preliminary products for the preparation of active ingredients, and also as a constituent of nonaqueous electrolytes in lithium ion cells.

DE 1178598 describes a process for preparing water-solubly modified polyvinyl alcohols by hydrolysis of copolymers of vinyl esters and 5-methyl-4,4-dialkyl-1,3-dioxolan-2-ones, and their use as protective colloids.

In Nettowaku Porima (2005), 26(3), 132-137 B. Ochiai describes the free-radical polymerization of 4-methylene-5,5-dimethyl-1,3-dioxolan-2-one. The polymerization takes place not only via the double bond but also with decarboxylation, and produces an oligomer carbonate having keto groups, which can be crosslinked with aromatic amines.

The present invention is based on the object of providing substances suitable as diluents for epoxy resins. These substances ought in particular to avoid the disadvantages of the reactive diluents known from the prior art and, in particular in comparison to conventional reactive diluents based on glycidyl ethers, ought to reduce the viscosity of the epoxy resins formulated with them, without significantly detracting from the mechanical properties and/or the solvent resistance of the cured epoxy resin compositions. It is desired, furthermore, that the reactivity of the epoxy resin compositions formulated with them is not significantly impaired.

It has surprisingly been found that these and further objects are achieved through the compounds of the general formula I as are defined hereinafter. Moreover, the addition just of small amounts of the compounds of the general formula I to epoxy resins results, surprisingly, in a significant increase in the reactivity of the epoxy resin composition, evident from a lower gel time following addition of a hardener.

The present invention accordingly provides for the use of compounds of the general formula I

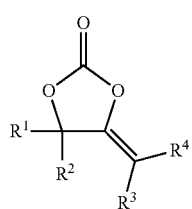

in which
$R^1$ and $R^2$ independently of each other are hydrogen, $C_1$-$C_6$-alkyl, $C_1$-$C_4$-alkoxy-$C_1$-$C_4$-alkyl, $C_5$-$C_6$-cycloalkyl, phenyl, phenyl-$C_1$-$C_4$-alkyl, $C_2$-$C_6$-alkenyl or $C_2$-$C_6$-alkynyl, or $R^1$ and $R^2$ together are a $C_3$-$C_{11}$-alkylene group;
$R^3$ and $R^4$ independently of each other are hydrogen, $C_1$-$C_6$-alkyl, $C_1$-$C_4$-alkoxy-$C_1$-$C_4$-alkyl, $C_5$-$C_6$-cycloalkyl, phenyl, phenyl-$C_1$-$C_4$-alkyl, $C_2$-$C_6$-alkenyl or $C_2$-$C_6$-alkynyl, or $R^3$ and $R^4$ together are a $C_4$-$C_6$-alkylene group;
or mixtures thereof, as an additive in epoxy resin compositions.

The invention further provides an epoxy resin composition which comprises
a) at least one epoxy resin as component A and
b) at least one compound of the formula (I) as component B.

The invention additionally provides for the use of these epoxy resin compositions as a binder constituent in coating materials, in casting compounds, in composite materials, especially in composite materials based on carbon fiber or glass fiber materials, for producing prepregs, and also as structural adhesives.

Other subject matter provided by the invention includes a method for curing the epoxide composition with addition of at least one hardener, more particularly at least one aminic hardener, and a method for coating surfaces with the epoxide composition.

In the context of the present invention, without further particularization, the term "epoxy resin" is used for uncured or partly cured epoxy resins (prepolymers). If it is intended to refer to fully cured or modified epoxy resins, or to compositions comprising epoxy resin, this is specified at the point in question.

Where no other indications are given, the general definitions applying in the context of the present invention to the terms used in connection with the substituents $R^1$, $R^2$, $R^3$, and $R^4$ are as follows:

"$C_1$-$C_6$-Alkyl" is a linear or branched alkyl radical having 1 to 6 carbon atoms. Such radicals include methyl, ethyl, n-propyl, isopropyl, n-butyl, 2-butyl, isobutyl, tert-butyl, n-pentyl, 1-methylbutyl, 2-methylbutyl, 3-methylbutyl, 1,1-dimethylpropyl, 1,2-dimethyl-propyl, 2,2-dimethylpropyl, 1-ethylpropyl, n-hexyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, 1-methylhexyl, 2-methylhexyl, 3-methylhexyl, 4-methylhexyl, 5-methylhexyl, 1-ethylpentyl, 2-ethylpentyl, 3-ethylpentyl, 1-propylpentyl, n-octyl, 1-methyloctyl, 2-methylheptyl, 1-ethylhexyl, 2-ethylhexyl, 1,2-dimethylhexyl, 1-propylpentyl, and 2-propylpentyl.

"$C_5$-$C_6$-Cycloalkyl" is a cyclic alkyl radical having 5 to 6 carbon atoms, such as cyclopentyl and cyclohexyl, for example.

"$C_2$-$C_6$-Alkenyl" is a linear or branched alkenyl radical having 2 to 6 carbon atoms, such as ethenyl, 1-propenyl, 2-propenyl, 1-methylethenyl, 1-butenyl, 2-butenyl, 3-butenyl, 1-methyl-1-propenyl, 2-methyl-1-propenyl, 1-methyl-2-propenyl, 2-methyl-2-propenyl, 1-pentenyl, 2-pentenyl, 3-pentenyl, 4-pentenyl, 1-methyl-1-butenyl, 2-methyl-1-butenyl, 3-methyl-1-butenyl, 1-methyl-2-butenyl, 2-methyl-2-butenyl, 3-methyl-2-butenyl, 1-methyl-3-butenyl, 2-methyl-3-butenyl, 3-methyl-3-butenyl, 1,1-dimethyl-2-propenyl, 1,2-dimethyl-1-propenyl, 1,2-dimethyl-2-propenyl, 1-ethyl-1-propenyl, 1-ethyl-2-propenyl, 1-hexenyl, 2-hexenyl, 3-hexenyl, 4-hexenyl, 5-hexenyl, 1-methyl-1-pentenyl, 2-methyl-1-pentenyl, 3-methyl-1-pentenyl, 4-methyl-1-pentenyl, 1-methyl-2-pentenyl, 2-methyl-2-pentenyl, 3-methyl-2-pentenyl, 4-methyl-2-pentenyl, 1-methyl-3-pentenyl, 2-methyl-3-pentenyl, 3-methyl-3-pentenyl, 4-methyl-3-pentenyl, 1-methyl-4-pentenyl, 2-methyl-4-pentenyl, 3-methyl-4-pentenyl, 4-methyl-4-pentenyl, 1,1-dimethyl-2-butenyl, 1,1-dimethyl-3-butenyl, 1,2-dimethyl-1-butenyl, 1,2-dimethyl-2-butenyl, 1,2-dimethyl-3-butenyl, 1,3-dimethyl-1-butenyl, 1,3-dimethyl-2-butenyl, 1,3-dimethyl-3-butenyl, 2,2-dimethyl-3-butenyl, 2,3-dimethyl-1-butenyl, 2,3-dimethyl-2-butenyl, 2,3-dimethyl-3-butenyl, 3,3-dimethyl-1-butenyl, 3,3-dimethyl-2-butenyl, 1-ethyl-1-butenyl, 1-ethyl-2-butenyl, 1-ethyl-3-butenyl, 2-ethyl-1-butenyl, 2-ethyl-2-butenyl, 2-ethyl-3-butenyl, 1,1,2-trimethyl-2-propenyl, 1-ethyl-1-methyl-2-propenyl, 1-ethyl-2-methyl-1-propenyl, 1-ethyl-2-methyl-2-propenyl.

"$C_2$-$C_6$-Alkynyl" is a linear or branched alkynyl having 2 to 6 carbon atoms, such as ethynyl, 1-propynyl, 2-propynyl, 1-butynyl, 2-butynyl, 3-butynyl, 1-methyl-2-propynyl, 1-pentynyl, 2-pentynyl, 3-pentynyl, 4-pentynyl, 1-methyl-2-butynyl, 1-methyl-3-butynyl, 2-methyl-3-butynyl, 3-methyl-1-butynyl, 1,1-dimethyl-2-propynyl, 1-ethyl-2-propynyl, 1-hexynyl, 2-hexynyl, 3-hexynyl, 4-hexynyl, 5-hexynyl, 1-methyl-2-pentynyl, 1-methyl-3-pentynyl, 1-methyl-4-pentynyl, 2-methyl-3-pentynyl, 2-methyl-4-pentynyl, 3-methyl-1-pentynyl, 3-methyl-4-pentynyl, 4-methyl-1-pentynyl, 4-methyl-2-pentynyl, 1,1-dimethyl-2-butynyl, 1,1-dimethyl-3-butynyl, 1,2-dimethyl-3-butynyl, 2,2-dimethyl-3-butynyl, 3,3-dimethyl-1-butynyl, 1-ethyl-2-butynyl, 1-ethyl-3-butynyl, 2-ethyl-3-butynyl, 1-ethyl-1-methyl-2-propynyl.

"$C_1$-$C_4$-Alkoxy" is an alkyl group having 1 to 4 carbon atoms that is attached via an oxygen, such as, for example, methoxy, ethoxy, n-propoxy, 1-methylethoxy (isopropoxy), butoxy, 1-methylpropoxy(sec-butoxy), 2-methylpropoxy (isobutoxy) or 1,1-dimethylethoxy(tert-butoxy).

"$C_1$-$C_4$-Alkoxy-$C_1$-$C_4$-alkyl" is a $C_1$-$C_4$-alkoxy group as defined above which is attached in the form of an ether bond, via the oxygen, to a $C_1$-$C_4$-alkyl group as defined above. Examples are methoxymethyl, 2-methoxyethyl, ethoxyethyl, 3-methoxypropyl, 3-ethoxypropyl.

"Phenyl-$C_1$-$C_4$-alkyl" is a phenyl group which is attached to a $C_1$-$C_4$-alkyl group as defined above. Examples are benzyl, phenylethyl, phenylpropyl, phenylbutyl.

"$C_3$-$C_{11}$-Alkylene" is an alkanediyl having 3 to 11 carbon atoms. Examples are n-propanediyl, n-butanediyl, n-pentanediyl, n-hexanediyl, n-heptanediyl, n-octanediyl, n-nonanediyl, n-decanediyl, n-undecanediyl, methylpropanediyl, methylbutanediyl, methylpentanediyl, methylhexanediyl, methylheptanediyl, methyloctanediyl, methylnonanediyl, methyldecanediyl, dimethylpropanediyl, dimethylbutanediyl, dimethylpentanediyl, dimethylhexanediyl, dimethylheptanediyl, dimethyloctanediyl, dimethylnonanediyl.

In relation to the use according to the invention, preferred compounds of the formula (I) are those in which the radicals $R^1$, $R^2$, $R^3$, and $R^4$ independently of one another have one or more of the following definitions:

$R^1$ is selected from hydrogen, $C_1$-$C_6$-alkyl, more particularly $C_1$-$C_4$-alkyl, very preferably methyl, ethyl, n-propyl and isopropyl, more particularly methyl and ethyl, $C_1$-$C_4$-alkoxy-$C_1$-$C_4$-alkyl, $C_5$-$C_6$-cycloalkyl, more particularly cyclohexyl, phenyl, phenyl-$C_1$-$C_4$-alkyl, more particularly benzyl, $C_2$-$C_6$-alkenyl and $C_2$-$C_6$-alkynyl;

$R^2$ is selected from hydrogen, $C_1$-$C_6$-alkyl, more particularly $C_1$-$C_4$-alkyl, very preferably methyl, ethyl, n-propyl and isopropyl, especially methyl or ethyl, $C_1$-$C_4$-alkoxy-$C_1$-$C_4$-alkyl, $C_5$-$C_6$-cycloalkyl, more particularly cyclohexyl, phenyl, phenyl-$C_1$-$C_4$-alkyl, more particularly benzyl, $C_2$-$C_6$-alkenyl and $C_2$-$C_6$-alkynyl;

$R^1$ and $R^2$ may also together be a $C_3$-$C_{11}$-alkylene group, preferably a $C_4$-$C_6$-alkylene group, such as, for example, 1,4-butanediyl, 1,5-pentanediyl or 1,6-hexanediyl, more particularly a linear $C_5$-alkylene group (1,5-pentanediyl);

$R^3$ is selected from hydrogen, $C_1$-$C_6$-alkyl, $C_1$-$C_4$-alkoxy-$C_1$-$C_4$-alkyl, $C_5$-$C_6$-cycloalkyl, phenyl, phenyl-$C_1$-$C_4$-alkyl, $C_2$-$C_6$-alkenyl, and $C_2$-$C_5$-alkynyl. Preferably $R^3$ is hydrogen;

$R^4$ is selected from hydrogen, $C_1$-$C_6$-alkyl, $C_1$-$C_4$-alkoxy-$C_1$-$C_4$-alkyl, $C_5$-$C_6$-cycloalkyl, phenyl, phenyl-$C_1$-$C_4$-alkyl, $C_2$-$C_6$-alkenyl, and $C_2$-$C_6$-alkynyl. Preferably $R^4$ is hydrogen;

$R^3$ and $R^4$ may also together be a $C_4$-$C_6$-alkylene group, such as 1,4-butanediyl, 1,5-pentanediyl or 1,6-hexanediyl, for example.

In preferred compounds of the formula I, at least one of the radicals $R^3$ and $R^4$, more particularly both radicals $R^3$ and $R^4$, is or are hydrogen.

Preference is given to the use of a compound of the formula I in which at least one of the radicals $R^1$, $R^2$, $R^3$, and $R^4$ is other than hydrogen. More particularly at least one of the radicals $R^1$ and/or $R^2$ is other than hydrogen, and at least one of the radicals $R^3$ and $R^4$, more particularly both radicals $R^3$ and $R^4$, is or are hydrogen.

With regard to the use according to the invention, particularly preferred compounds of the formula (I) are those in which the radicals $R^1$ and $R^2$ have the definitions below, the radicals $R^3$ and $R^4$ have the definitions indicated above, and preferably one of the radicals, $R^3$ or $R^4$, is hydrogen, and more particularly both radicals, $R^3$ and $R^4$, are hydrogen:

$R^1$ is selected from hydrogen and $C_1$-$C_4$-alkyl, more particularly hydrogen, methyl or ethyl;

$R^2$ is selected from $C_1$-$C_4$-alkyl, $C_1$-$C_4$-alkoxy-$C_1$-$C_4$-alkyl, $C_5$-$C_6$-cycloalkyl, phenyl, phenyl-$C_1$-$C_4$-alkyl, $C_2$-$C_6$-alkenyl and $C_2$-$C_6$-alkynyl, more particularly from $C_1$-$C_4$-alkyl and $C_1$-$C_4$-alkoxy-$C_1$-$C_4$-alkyl, and especially from methyl or ethyl.

In one particularly preferred embodiment of the invention, $R^1$ and $R^2$ are each $C_1$-$C_4$-alkyl, more particularly methyl or ethyl. In this particularly preferred embodiment, the radicals $R^3$ and $R^4$ have the definitions indicated above, and preferably one of the radicals, $R^3$ or $R^4$, is hydrogen, and more particularly both radicals, $R^3$ and $R^4$, are hydrogen.

In a likewise particularly preferred embodiment of the invention, $R^1$ and $R^2$ together are a $C_4$-$C_6$-alkylene group, such as 1,4-butanediyl, 1,5-pentanediyl or 1,6-hexanediyl, for example, more particularly a linear $C_5$-alkylene group (1,5-pentanediyl). In this particularly preferred embodiment, the radicals $R^3$ and $R^4$ have the definitions indicated above, and preferably one of the radicals, $R^3$ or $R^4$, is hydrogen, and more particularly both radicals, $R^3$ and $R^4$, are hydrogen.

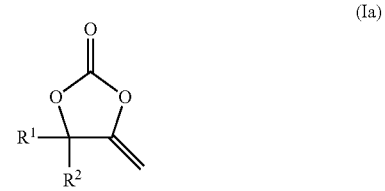
(Ia)

Preference is given to compounds of the general formula Ia in which $R^1$ and $R^2$ have one of the definitions given above, and to mixtures thereof. Particularly preferred compounds of the general formula Ia are those in which $R^1$ and $R^2$ display the definitions described in table 1.

TABLE 1

Examples of inventive compounds of the formula Ia

| No. | $R^1$ | $R^2$ |
|---|---|---|
| 1 | methyl | phenyl |
| 2 | methyl | H |
| 3 | methyl | methyl |
| 4 | methyl | n-propyl |
| 5 | methyl | isopropyl |
| 6 | methyl | n-butyl |
| 7 | methyl | isobutyl |
| 8 | ethyl | H |
| 9 | ethyl | methyl |
| 10 | ethyl | ethyl |
| 11 | ethyl | isopropyl |
| 12 | ethyl | n-butyl |
| 13 | n-butanediyl | |
| 14 | n-pentanediyl | |
| 15 | n-heptanediyl | |
| 16 | n-undecanediyl | |
| 17 | H | H |
| 18 | H | methyl |
| 19 | H | n-propyl |
| 20 | H | isopropyl |
| 21 | H | n-butyl |
| 22 | H | isobutyl |
| 23 | H | phenyl |

Of these, particular preference is given to the following compounds and mixtures thereof:

4,4-diethyl-5-methylene-1,3-dioxolan-2-one
4,4-dimethyl-5-methylene-1,3-dioxolan-2-one
4-methyl-5-methylene-1,3-dioxolan-2-one
4-ethyl-5-methylene-1,3-dioxolan-2-one 4-ethyl-4-methyl-5-methylene-1,3-dioxolan-2-one
4-isopropyl-5-methylene-1,3-dioxolan-2-one
4-isopropyl-4-methyl-5-methylene-1,3-dioxolan-2-one
4-methylene-1,3-dioxaspiro[4.5]decan-2-one
4-phenyl-4-methyl-5-methylene-1,3-dioxolan-2-one
4-n-propyl-5-methylene-1,3-dioxolan-2-one
4-n-propyl-4-methyl-5-methylene-1,3-dioxolan-2-one
4-methylene-1,3-dioxolan-2-one The compounds of the formulae I and Ia used in accordance with the invention, which in the text below are also identified as exo-vinylene carbonates, are known in principle from the prior art, as for example from DE 1098953, DE 3433403, EP 837062, JP 2006-137733, JP 2008222619, J. Org. Chem. 2007, 72, 647-649; Angew. Chem. 2009, 121, 4258-4261; Eur. J. Org. Chem. 2007, 2604-2607; Eur. J. Org. Chem. 2008, 2309-2312; Org. Lett. 2006, 8, 515-518.

Compounds of the formula I in which at least one of the two radicals $R^3$ and $R^4$ is hydrogen (also compounds Ib below) may be prepared, for example, by reacting optionally substituted propargyl alcohols of the formula II with $CO_2$ in the presence of a catalyst. In formulae Ib and II, $R^1$ and $R^2$ possess the definitions indicated above, and R' has one of the definitions indicated for $R^3$ or $R^4$.

Scheme 1. Preparation of exo-vinylene carbonates

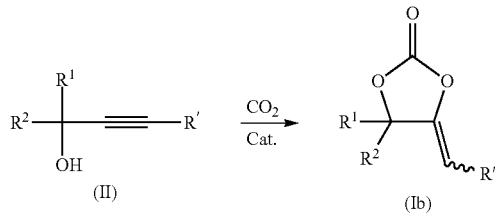

Suitable catalysts ("Cat.") are in principle transition metal catalysts comprising as active metal, for example, silver, copper, gold, palladium or platinum, examples being silver salts such as silver acetate, silver carbonate, copper(II) salts such as copper acetate, or copper(I) halides such as CuI, CuBr, CuCl, and also palladium(0) catalysts, it being possible for the aforementioned transition metal compounds to be used optionally in combination with an organic amine, such as a tri-$C_1$-$C_6$-alkylamine such as triethylamine, or an amidine base such as diazabicyclo[4.3.0]nonene (DBN) or diazabicyclo[5.4.0]undecene (DBU), or with an organic phosphine, examples being trialkylphosphines or triarylphosphines such as tributylphosphine or triphenylphosphine, or in combination with a mixture of one of the aforementioned phosphines with an ammonium salt such as, for example tri-$C_1$-$C_6$-alkylammonium halides or tetra-$C_1$-$C_6$-alkylammonium halides. Also contemplated as catalysts are organophosphines as such, examples being trialkylphosphines or triarylphosphines such as tributylphosphine or triphenylphosphine, and also sterically hindered carbenes, examples being 1,3-substituted 2,3-dihydroimidazol-2-ylidene compounds such as 1,3-diisopropyl-2,3-dihydro-4,5-imidazol-2-ylidene or the $CO_2$ adducts thereof, and also combinations thereof with the aforementioned phosphines. The reaction may be carried out without pressure or, preferably, under increased pressure, as for example at 50 to 500 bar, or in supercritical $CO_2$. With regard to the reaction conditions, reference is made to the literature cited above.

Instead of $CO_2$ it is also possible for a carboxylic anhydride such as, for example, bis(tert-butyl)dicarbonic anhydride ($Boc_2O$) to be used. In that case the reaction takes place typically in two stages, involving reaction in the first stage of the compound II with an ester of the biscarbonic anhydride, e.g., with $Boc_2O$, in the presence of a base, such as sodium hydride, for example, and the cyclization of the resultant ester in the presence of a transition metal catalyst, e.g., a catalyst containing gold. One such procedure is described in Org. Lett. 2006, 8, 515-518, for example, hereby incorporated by reference.

Compounds of the formula I in which one or both radicals $R^3$ and/or $R^4$ are/is a radical other than hydrogen may be prepared starting from compounds of the formula I in which both radicals $R^3$ and $R^4$ are hydrogen (compounds Ia and Ib, respectively), by Heck coupling, in analogy, for example, to the method described in Tetrahedron Lett. 2000, 5527-5531.

In accordance with the invention the compounds of the formula I are used in epoxy resin compositions. In addition to a diluent effect, i.e., a reduction in the viscosity, a significant increase in the reactivity of the epoxy resin compositions, also occurs particularly in the case of aminic curing. Generally, the desired diluent effect but also the increased reactivity is apparent when even small amounts of the compound of the formulae I and/or Ia or Ib or a mixture of compounds of the formulae I or Ia or Ib are added to a conventional epoxy resin composition. In general, the compound(s) of the formulae I and/or Ia or Ib will be used in a total amount of at least 0.001 part by weight, frequently at least 0.005 part by weight, more particularly at least 0.01 part by weight, per part by weight of the epoxy resin component A. The compound(s) of the formulae I and/or Ia or Ib will frequently be used in a total amount of not more than 1 part by weight, preferably not more than 0.7 part by weight, more particularly not more than 0.5 part by weight, per part by weight of the epoxy resin component.

In the epoxy resin compositions of the invention, accordingly, the total amount of compounds of the formulae I and/or Ia or Ib is generally 0.1% to 50% by weight, frequently 0.5% to 40% by weight, and more particularly 1% to 30% by weight, based on the total amount of compounds of the formulae I and/or Ia or Ib plus epoxy resin component A.

As component A of the epoxy resin compositions of the invention it is possible in principle to use all substances which contain epoxide groups and which are typically used in curable epoxy resin compositions. Contemplated in particular are epoxy compounds having 1 to 10 epoxy groups, preferably at least having two epoxy groups in the molecule. The amount of epoxide groups in typical substances of component A is commonly in the range from 120 to 3000 g/equivalent, calculated as what is called the epoxide equivalent in accordance with DIN 16945.

Preferred among these compounds are what are called glycidyl-based epoxy resins, more particularly those prepared by etherification of aromatic, aliphatic or cycloaliphatic polyols with epichlorohydrin. Substances of this kind are frequently also referred to as polyglycidyl ethers of aromatic, or as polyglycidyl ethers of aliphatic or cycloaliphatic polyols, respectively.

The epoxy resins of component A may be liquid resins, solid resins or mixtures thereof. Liquid resins differ from solid resins in lower viscosity. Moreover, liquid resins generally have a higher proportion of epoxide groups and, accordingly, a lower epoxide equivalent.

The amount of epoxide groups in typical liquid resins of component A is commonly in the range from 120 to 200 g/equivalent, and that of the solid resins is in the region of 450-3000 g/equivalent, calculated as what is called the epoxide equivalent in accordance with DIN 16945.

The viscosity of the liquid resins of component A at 25° C. is typically in the range from 1 to 20 Pas, preferably in the range from 5 to 15 Pas. The viscosity of the solid resins at 25° C. is typically in the 5 to 40 Pas range, preferably in the range from 20 to 40 Pas. The viscosities reported here are the values determined in accordance with DIN 53015 at 25° C. as 40% strength solutions of the resins in methyl ethyl ketone.

Examples of suitable epoxy resins are the products available commercially as EPILOX®, EPONEX®, EPIKOTE®, EPONOL®, D.E.R, ARALDITE or ARACAST, e.g. EPILOX A 17-00, A 17-01, A 18-00, A 19-00, A 19-01, A 19-02, A 19-03, A 19-04, F 17-00, T 19-27, AF 18-50, AF 18-30, F 16-01, P 22-00 from Leuna-Harze GmbH, Epon Resin 825, 826, 828, 830, 834, 862, 863, 813, 815C, 824, 872, 8131, 8132, 8201, 8280, 8281, CS-241, CS 377 from Hexion, D.E.R 640, 642U, 671, 662, 663U, 664, 667, 672U from Dow, and Araldit® GT 6063, 6064, 6084, 6097, 7004, 7220, 7225, 7072, 7097, 7203, 7220 and 7304 from Huntsman.

In one preferred embodiment of the invention, the epoxy resin component A is selected from polyglycidyl ethers of aromatic polyols. Examples thereof are the resins derived from the diglycidyl ether of bisphenol A (DGEBA resins, R'=CH$_3$), and the resins derived from bisphenol F (R'=H), which can be described by the general formula which follows:

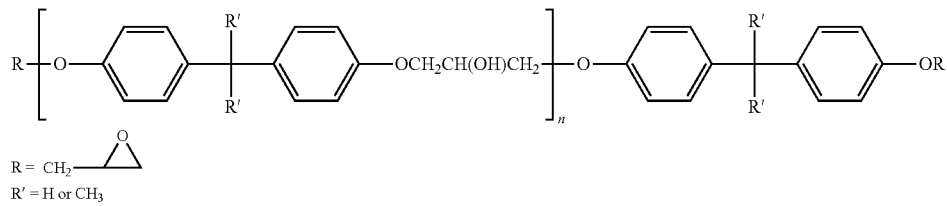

In the formula, the parameter n indicates the number of repeating units, and the average value of n corresponds to the respective average molecular weight.

Examples of epoxy resins based on polyglycidyl ethers of aromatic polyols are, additionally, glycidyl ethers of phenol- and cresol-based novolaks. Novolaks are prepared by the acid-catalyzed condensation of formaldehyde and phenol or cresol. Reacting the novolaks with epichlorohydrin produces the glycidyl ethers of the novolaks.

In another preferred embodiment of the invention, the epoxy resin component A is selected from polyglycidyl ethers of cycloaliphatic polyols and the polyglycidyl esters of cycloaliphatic polycarboxylic acids. Examples of polyglycidyl ethers of cycloaliphatic polyols are the ring hydrogenation products of polyglycidyl ethers based on bisphenol A, the ring hydrogenation products of polyglycidyl ethers based on bisphenol F, the ring hydrogenation products of polyglycidyl ethers based on novolaks, and mixtures thereof. Compounds of this kind are typically prepared by selective hydrogenation of the aromatic rings in the aforementioned aromatic polyglycidyl ethers. Examples of such products are the P 22-00 from LeunaHarze, and Eponex 1510 from Hexion. Examples of polyglycidyl esters of cycloaliphatic polycarboxylic acids include diglycidyl hexahydrophthalate.

Also suitable as epoxy resins A for the coating formulations of the invention are polyacrylate resins containing epoxide groups. These resins are prepared generally by copolymerization of at least one ethylenically unsaturated monomer which comprises in the molecule at least one epoxide group, more particularly in the form of a glycidyl ether group, with at least one further ethylenically unsaturated monomer which comprises no epoxide group in the molecule; at least one of the comonomers is preferably an ester of acrylic acid or methacrylic acid. Examples of the ethylenically unsaturated monomers which comprise at least one epoxide group in the molecule are glycidyl acrylate, glycidyl methacrylate, and allyl glycidyl ether. Examples of ethylenically unsaturated monomers which comprise no epoxide group in the molecule are alkyl esters of acrylic and methacrylic acid which comprise 1 to 20 carbon atoms in the alkyl radical, more particularly methyl acrylate, methyl methacrylate, ethyl acrylate, ethyl methacrylate, butyl acrylate, butyl methacrylate, 2-ethylhexyl acrylate, and 2-ethylhexyl methacrylate. Other examples of ethylenically unsaturated monomers which comprise no epoxide groups in the molecule are acids, such as acrylic acid and methacrylic acid, acid amides, such as acrylamide and methacrylamide, vinyl aromatic compounds, such as styrene, methylstyrene, and vinyltoluene, nitriles, such as acrylonitrile and methacrylonitrile, vinyl halides and vinylidine halides, such as vinyl chloride and vinylidine fluoride, vinyl esters, such as vinyl acetate, and hydroxyl-containing monomers, such as hydroxyethyl acrylate and hydroxyethyl methacrylate, for example. The epoxide-group-containing polyacrylate resin typically has an epoxide equivalent weight of 400 to 2500, preferably 500 to 1500, very preferably 600 to 1200. The number-average molecular weight (determined by gel permeation chromatography using a polystyrene standard) is typically in the range from 1000 to 15 000, preferably from 1200 to 7000, more preferably from 1500 to 5000. The glass transition temperature (TG) is typically in the range from 30 to 80° C., preferably from 40 to 70° C., more preferably from 50 to 70° C. (measured by means of differential calorimetry (DSC)). Polyacrylate resins containing epoxide groups are known (cf., e.g., EP-A-299 420, DE-B-22 14 650, DE-B-27 49 576, U.S. Pat. No. 4,091,048 and U.S. Pat. No. 3,781,379). Examples of such resins are Epon 8021, Epon 8111, Epon 8161 from Hexion.

The epoxy resins of component A may also derive from other epoxides (nonglycidyl ether epoxy resins). These include, in particular, compounds, including oligomers and polymers, which have at least one, more particularly two or more, epoxidized cycloaliphatic group(s), more particularly 7-oxabicyclo-[4.1.0]-heptyl groups, which are obtainable by epoxidation of compounds having cyclohexenyl groups. Examples of the epoxidation products of compounds having at least one cycloolefinic group are 4-epoxyethyl-1,2-epoxycyclohexane and the compound of the following formula:

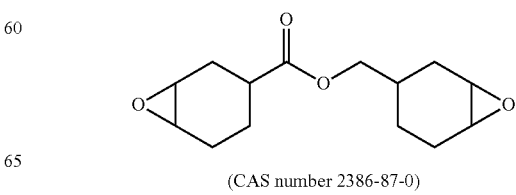

(CAS number 2386-87-0)

which is sold, for example, by Cytec under the name Uvacure 1500. Preference is given to using the compounds which have at least one, more particularly two or more, epoxidized cycloaliphatic groups, more particularly 7-oxabicyclo-[4.1.0]-heptyl groups, which are obtainable by epoxidation of compounds having cyclohexenyl groups, and their oligomers, not alone but instead in combination with one or more of the aforementioned substances which have at least two glycidyl ether groups in the molecule.

Besides the epoxy resins of component A and the compounds of the formula I, the epoxy resin compositions may also comprise conventional reactive diluents. By these are meant, in particular, low molecular weight compounds having a molecular weight of preferably not more than 250 daltons, e.g., in the range from 100 to 250 daltons, and which contain oxirane groups, preferably glycidyl groups, in the form, for example, of glycidyl ether groups, glycidyl ester groups or glycidyl amide groups. The epoxide functionality, i.e., the number of epoxide groups per molecule, in the case of the reactive diluents is typically in the range from 1 to 3, more particularly in the range from 1.2 to 2.5. Preferred among these are, in particular, glycidyl ethers of aliphatic or cycloaliphatic alcohols which have preferably 1, 2, 3 or 4 OH groups and 2 to 20 or 4 to 20 C atoms, and also glycidyl ethers of aliphatic polyetherols which have 4 to 20 C atoms. Examples of such are as follows:

- glycidyl ethers of saturated alkanols having 2 to 20 C atoms, such as $C_2$-$C_{20}$-alkyl glycidyl ethers such as 2-ethylhexyl glycidyl ether, for example;
- glycidyl ethers of saturated alkanepolyols having 2 to 20 C atoms, examples being the glycidyl ethers of 1,4-butanediol, 1,6-hexanediol, trimethylolpropane or of pentaerythritol, the aforementioned glycidyl ether compounds generally having an epoxide functionality in the range from 1 to 3.0 and preferably in the range from 1.2 to 2.5;
- glycidyl ethers of polyetherols having 4 to 20 C atoms, examples being glycidyl ethers of diethylene glycol, triethylene glycol, tetraethylene glycol, dipropylene glycol or tripropylene glycol;
- glycidyl ethers of cycloaliphatic alcohols having 5 to 20 C atoms, such as, for example, bisglycidyl ethers of cyclohexane-1,4-diyl, the bisglycidyl ether of ring-hydrogenated bisphenol A or of ring-hydrogenated bisphenol F;
- glycidyl ethers of polyalkylene oxides having 2 to 4 C atoms such as polyethylene oxide or polypropylene oxide;

and mixtures of the above substances.

Where desired, the conventional reactive diluents are used in the formulations of the invention in a total amount of at least 0.01 part by weight, frequently at least 0.02 part by weight, more particularly at least 0.05 part by weight, per part by weight of the epoxy resin component A. Since the compounds of the formula I compensate or even overcompensate the reduction in reactivity that is frequently brought about by conventional reactive diluents, the conventional reactive diluents can be used in a larger amount than in the prior art. In general, however, the conventional reactive diluents will be used in a total amount of not more than 1 part by weight, preferably not more than 0.8 part by weight, more particularly not more than 0.7 part by weight, per part by weight of the epoxy resin component. The total amount of conventional reactive diluent plus compound of the formula I will preferably be not more than 1.1 parts by weight, in particular not more than 1 part by weight, and especially not more than 0.9 part by weight, per part by weight of the epoxy resin component A. Where the epoxy resin compositions of the invention comprise one or more conventional reactive diluents, the weight ratio of compound of the formula I to conventional reactive diluent is typically in a range from 1:100 to 100:1, more particularly in the range from 1:50 to 50:1.

In particular the conventional reactive diluent will account for not more than 10% by weight, based on the total amount of reactive diluent+compound I. In another embodiment of the invention, the weight ratio of compound I to conventional reactive diluent is in the range from 1:10 to 10:1, more particularly in the range from 1:5 to 5:1, and especially in the range from 1:2 to 2:1.

Besides the compound I and the epoxy resin component A, and also, optionally, one or more conventional reactive diluents, as component C, the epoxy resin compositions of the invention may comprise conventional organic diluents. By these are meant organic solvents which at atmospheric pressure have a boiling point of below 200° C. and which do not enter into any bond-forming reaction with the epoxide groups and with the groups of any reactive diluent optionally present. Conventional diluents are typically organic solvents, examples being ketones having preferably 3 to 8 C atoms such as acetone, methyl ethyl ketone, cyclohexanone, and the like, esters of aliphatic carboxylic acids, preferably of acetic acid, of propionic acid or of butanoic acid, more particularly the $C_1$-$C_6$-alkyl esters of these acids such as ethyl acetate, propyl acetate, and butyl acetate, aromatic hydrocarbons, especially alkylaromatics such as, for example, toluene, mesitylene, 1,2,4-trimethylbenzene, n-propylbenzene, isopropylbenzene, cumine, or xylenes, and mixtures of alkylaromatics, more particularly technical mixtures of the kind available commercially, for example, as Solvesso grades, and aliphatic and cycloaliphatic hydrocarbons, and also alkanols having preferably 1 to 8 C atoms and cycloalkanols having preferably 5 to 8 C atoms, such as methanol, ethanol, n- and isopropanol, butanols, hexanols, cyclopentanol and cyclohexanol, and the like.

In one preferred embodiment the composition comprises solvents at most in minor amounts (less than 20% by weight, in particular less than 10% by weight or less than 5% by weight, based on the total amount of epoxy resin component A+C and compound of the formula I) and with particular preference no solvent (100% system).

Besides the aforementioned constituents, the epoxy resin composition may comprise the additives and/or fillers that are customary for such compositions.

Examples of suitable fillers include inorganic or organic particulate materials such as, for example, calcium carbonates and silicates and also inorganic fiber materials such as glass fibers, for example. Organic fillers such as carbon fibers and mixtures of organic and inorganic fillers, such as mixtures of glass fibers and carbon fibers or mixtures of carbon fibers and inorganic fillers, for example, may also find application. The fillers can be added in an amount of 1% to 70% by weight, based on the total weight of the composition.

Suitable conventional additives comprise, for example, antioxidants, UV absorbers/light stabilizers, metal deactivators, antistats, reinforcers, fillers, antifogging agents, blowing/propelling agents, biocides, plasticizers, lubricants, emulsifiers, colorants, pigments, rheological agents, impact tougheners, catalysts, adhesion regulators, optical brighteners, flame retardants, antidropping agents, nucleating agents, solvents, and reactive diluents, and also mixtures of these.

The optionally used light stabilizers/UV absorbers, antioxidants, and metal deactivators preferably have a high migration stability and temperature stability. They are selected, for example, from groups a) to t). The compounds of groups a) to g) and i) constitute light stabilizers/UV absorbers, while compounds j) to t) act as stabilizers.
a) 4,4-diarylbutadienes,
b) cinnamic esters,
c) benzotriazoles,
d) hydroxybenzophenones,
e) diphenylcyanoacrylates,
f) oxamides,
g) 2-phenyl-1,3,5-triazines,
h) antioxidants,
i) nickel compounds,
j) sterically hindered amines,
k) metal deactivators,
l) phosphites and phosphonites,
m) hydroxylamines,
n) nitrones,
o) amine oxides,
p) benzofuranones and indolinones,
q) thiosynergists,
r) peroxide-destroying compounds,
s) polyamide stabilizers, and
t) basic costabilizers.

The choice of suitable conventional additives for the composition of the invention is dependent on the particular end use of the cured epoxy resins and can be determined in each individual case by the skilled worker.

The curing of the epoxy resin compositions of the invention is effected typically by means of suitable hardeners, which are generally added shortly before curing. In one inventively preferred embodiment the epoxy resin composition is what is called a 2-pack system, which is cured by addition of a crosslinker. In other words, epoxy resin compositions of this kind are substantially free from hardeners and are cured only through addition of a hardener. Substantially free from hardeners means that the amount of hardener is less than 10%, preferably less than 5%, more particularly less than 1% of the amount of hardener needed for curing. Substantially free from hardeners means in particular that the amount of hardener is less than 5% by weight, preferably less than 1% by weight, more particularly less than 0.5%, based on the total weight of the epoxy resin composition of the invention.

The amount of hardener required for curing is determined in a conventional way via the number of epoxide groups in the formulation and the number of functional groups in the hardener. The number of epoxide groups in the epoxide resin is stated as what is called the epoxide equivalent. The epoxide equivalent is determined in accordance with DIN 16945.

The number of reactive groups in the hardener is calculated, in the case of the inventively preferred amine hardeners, via the amine number in accordance with DIN 16945.

The epoxy resin compositions of the invention may also comprise one or more suitable catalysts for the cure, which are guided in a known way by the nature of the reactive functional groups in the binder.

Suitable catalysts for the curing of the epoxy resin formulations are phosphonium salts of organic or inorganic acids, imidazole and imidazole derivatives, quaternary ammonium compounds, and amines. The catalysts, where desired, are used in proportions of 0.01% by weight to about 10% by weight, based on the total weight of the epoxy resin, the compound I, and hardener(s). In one preferred embodiment there is no need for catalysts, i.e., the amount of catalysts in the composition is less than 0.01% by weight.

The invention also provides a method for curing the epoxy resin composition of the invention, which comprises reacting the epoxy resin composition with at least one hardener, preferably with at least one aminic hardener.

The inventively preferred aminic hardeners include aliphatic and cycloaliphatic polyamines, aromatic polyamines, amino resins, and polyamido amines, which may be used optionally in combination with urons, amides, guanidines, ketimines, isocyanates, imidazoles, and imidazolines.

Preference is given to amine hardeners. Amine hardeners crosslink epoxy resins by reaction of the primary or secondary amino functions of the polyamines with terminal epoxide groups of the epoxy resins. Preferred polyamine hardeners have on average at least two primary or secondary amino groups per molecule, e.g., two, three or four primary or secondary amino groups per molecule. Suitable polyamines are, for example, aliphatic polyamines such as ethylenediamine, 1,2- and 1,3-propanediamine, neopentanediamine, hexamethylenediamine, octamethylenediamine, 1,10-diaminodecane, 1,12-diaminododecane, diethylenetriamine, triethylenetetramine, tetraethylenepentamine, trimethylhexamethylenediamine, 1-(3-aminopropyl)-3-aminopropane, 1,3-bis(3-aminopropyl)propane, 4-ethyl-4-methylamino-1-octyl-amine, and the like;

cycloaliphatic diamines, such as 1,2-diaminocyclohexane, 1,3-bis(aminomethyl)-cyclohexane, 1-methyl-2,4-diaminocyclohexane, 4-(2-aminopropan-2-yl)-1-methylcyclohexane-1-amine, isophoronediamine, 4,4'-diaminodicyclo-hexylmethane, 3,3'-dimethyl-4,4'-diaminodicyclohexylmethane, 4,8-diaminotricyclo[5.2.1.0]decane, norbornanediamine, menthanediamine, menthenediamine, and the like;

aromatic diamines, such as tolylenediamine, xylylenediamine, especially meta-xylylenediamine, bis(4-aminophenyl)methane (MDA or methylenedianiline), bis(4-aminophenyl)sulfone (also known as DADS, DDS or dapsone), and the like;

cyclic polyamines, such as piperazine, aminoethylpiperazine, and the like;

polyetheramines, especially difunctional and trifunctional primary polyetheramine based on polypropylene glycol, polyethylene glycol, polybutylene oxide, poly(1,4-butanediol), poly-THF or polypentylene oxide, e.g., 4,7,10-trioxamidecane-1,3-diamine, 4,7,10-trioxamidecane-1,13-diamine, 1,8-diamino-3,6-dioxaoctane (XTJ-504 from Huntsman), 1,10-diamino-4,7-dioxadecane (XTJ-590 from Huntsman), 1,12-diamino-4,9-dioxadodecane (BASF SE), 1,3-diamino-4,7,10-trioxamidecane (BASF), primary polyetheramines based on polypropylene glycol having an average molar mass of 230 such as, for example, polyetheramine D 230 (BASF SE) or Jeffamine® D 230 (Huntsman), difunctional, primary polyetheramines based on polypropylene glycol having an average molar mass of 400, e.g. polyetheramine D 400 (BASF SE) or Jeffamine® XTJ 582 (Huntsman), difunctional, primary polyetheramines based on polypropylene glycol having an average molar mass of 2000 such as, for example, polyetheramine D 2000 (BASF SE), Jeffamine® D2000 or Jeffamine® XTJ 578 (Huntsman), difunctional, primary polyetheramines based on propylene oxide having an average molar mass of 4000 such as, for example, polyetheramine D 4000 (BASF SE), trifunctional, primary polyetheramines prepared by reacting propylene oxide with trimethylolpropane followed by an amination of the terminal OH groups, having an average molar mass of 403, such as, for example, polyetheramine T 403 (BASF SE) or Jeffamine® T 403 (Huntsman), trifunctional, primary polyetheramine prepared by reacting propylene oxide with glycerol, followed by an amination of the terminal OH groups, having an average molar mass of 5000, such as, for example, polyetheramine T 5000 (BASF SE) or Jeffamine® T 5000 (Huntsman), aliphatic polyetheramines constructed from a propylene oxide-grafted polyethylene glycol and having an average molar mass of 600, such as, for example, Jeffamine® ED-600 or Jeffamine® XTJ 501 (each Huntsman), aliphatic polyetheramines constructed from a propylene oxide-grafted polyethylene glycol and having an average molar mass of 900, such as, for example, Jeffamine® ED-900 (Huntsman), aliphatic polyetheramines constructed from a propylene oxide-grafted polyethylene glycol and having an average molar mass of 2000, such as, for example, Jeffamine® ED-2003 (Huntsman), difunctional, primary polyetheramine prepared by amination of a propylene oxide-grafted diethylene glycol, having an average molar mass of 220, such as, for example, Jeffamine® HK-511 (Huntsman), aliphatic polyetheramines based on a copolymer of poly(tetramethylene ether glycol) and polypropylene glycol having an average molar mass of 1000 such as, for example, Jeffamine® XTJ-542 (Huntsman), aliphatic polyetheramines based on a copolymer of poly(tetra-methylene ether glycol) and polypropylene glycol having an average molar mass of 1900, such as, for example Jeffamine® XTJ-548 (Huntsman), aliphatic polyetheramines based on a copolymer of poly(tetramethylene ether glycol) and polypropylene glycol having an average molar mass of 1400 such as, for example, Jeffamine® XTJ-559 (Huntsman), polyethertriamines based on a butylene oxide-grafted alcohol having a functionality of at least three, having an average molar mass of 400, such as, for example, Jeffamine® XTJ-566 (Huntsman), aliphatic polyetheramines prepared by amination of butylene oxide-grafted alcohols having an average molar mass of 219, such as, for example, Jeffamine® XTJ-568 (Huntsman), polyetheramines based on pentaerythritol and propylene oxide having an average molar mass of 600 such as, for example, Jeffamine® XTJ-616 (Huntsman), polyetheramines based on triethylene glycol having an average molar mass of 148, e.g., Jeffamine® EDR-148 (Huntsman), difunctional, primary polyetheramines prepared by amination of a propylene oxide-grafted ethylene glycol, having an average molar mass of 176, such as, for example, Jeffamine® EDR-176 (Huntsman), and also polyetheramines prepared by amination of PolyTHF having an average molar mass of 250, e.g., PolyTHF-Amine 350 (BASF SE), and mixtures of these amines;

polyamide diamines (amidopolyamines) which are obtainable by reaction of dimeric fatty acids (e.g., dimeric linoleic acid) with low molecular mass polyamines, such as diethylenetriamine, 1-(3-aminopropyl)-3-aminopropane or triethylenetetramine, or other diamines such as the aforementioned aliphatic or cycloaliphatic diamines;

and also mixtures of the above amine hardeners, more particularly mixtures of difunctional amines from the group of the aliphatic, cycloaliphatic, and aromatic amines with the aforementioned polyetheramines.

The hardeners are used in amounts such that the ratio of the number of all of the reactive groups to the number of all of the epoxide groups in the epoxy resin is 2:1 to 1:2, preferably 1.5:1 to 1:1.5, and more particularly about 1:1. In the case of a stoichiometric ratio of approximately 1:1, a cured resin is obtained which has optimum thermoset properties. Depending on the desired properties of the resin after crosslinking, however, it may also be useful to use hardener and epoxy resin in different ratios of the reactive groups.

In the epoxy resin compositions of the invention, accordingly, the total amount of hardeners is generally 0.1% to 50%, frequently 0.5% to 40%, and more particularly 1% to 30%, by weight, based on the total amount of compounds of the formulae I and/or Ia or Ib, plus epoxy resin component A, plus hardeners used.

For curing it is also possible to add accelerators to the epoxy resin composition. Examples of accelerators are substituted imidazoles such as 1-methylimidazole, 2-methylimidazole, 2,4-ethylmethylimidazole, 2-phenylimidazole, 1-cyanoethylimidazole, imidazolines such as 2-phenylimidazoline, tertiary amines such as N,N-dimethylbenzylamine, 1,4-diazabicyclo[2,2,2]octane (DABCO), 1,8-diazabicyclo-[5.4.0]-undec-7-ene (DBU), S-triazine (Lupragen N 600), bis(2-dimethylaminoethyl)ether (Lupragen N 206), pentamethyldiethylenetriamine (Lupragen N 301), trimethylaminoethylethanolamine (Lupragen N 400), tetramethyl-1,6-hexanediamine (Lupragen N 500), aminoethylmorpholine, 2,4,6-tris(dimethylaminomethyl)phenol (DMP 30), phenols and phenolic resins such as bisphenol A, bisphenol F, nonylphenol, p-tert-butylphenol, phenolic resins of the novolak type, salicylic acid, p-toluenesulfonic acid, aminopropylmorpholine, aminoethylethyleneurea, ketimines such as Epikure 3502 (a reaction product of ethylenediamine with methyl isobutyl ketone), urons such as 3-(4-chlorophenyl)-1,1-dimethylurea (monuron), 3-(3,4-dichlorophenyl)-1,1-dimethylurea (diuron), 3-phenyl-1,1-dimethylurea (fenuron), 3-(3-chloro-4-methylphenyl)-1,1-dimethylurea (chlorotoluron), tolyl-2,4-bis-N,N-dimethylcarbamide (Amicure UR2T), dicyandiamide (DICY), Mannich bases or secondary amines such as dialkylamines, examples being di-(2-ethylhexyl)amine, dibutylamine, dipropylamine, ditridecylamine, N,N'-diisopropylisophoronediamine (Jefflink® XTJ-584), N,N'-diisobutyl-4,4'-diaminodicyclohexylmethane (Clearlink 1000), N-(hydroxyethyl)aniline, di(2-methoxyethyl)amine and also di- and polyisocyanates such as hexamethylene diisocyanate, isophorone diisocyanate, and the like.

The epoxy resin composition of the invention may be cured thermally by heating the mixture of epoxy resin and hardener to a temperature above the mixing temperature. Since, however, the presence of the compound of the formula I typically entails a significant increase in the level of reactivity of the epoxy resin compositions formulated with it, curing may also take place at low temperatures. Curing of the epoxy resin compositions of the invention is effected typically at temperatures in the range from 0 to 200° C., preferably in the range from 5 to 180° C., and more particularly in the range from 10 to 150° C. Which temperature is suitable is dependent on the particular hardeners and epoxy resins and on the desired curing rate, and can be determined in each individual case by the skilled worker on the basis, for example, of simple preliminary tests. In the lower temperature range (5 to around 35° C.), which indeed corresponds to the ambient temperature that is usually prevalent, it is of course sufficient to mix epoxy resin and hardener.

Alternatively, curing takes place preferably with microwave induction.

The epoxy resin compositions of the invention can be used in a diversity of ways. They are suitable in principle for all applications where 1-pack or 2-pack epoxy resin formulations are typically employed. They are suitable, for example, as a binder constituent in coating or impregnating materials, as adhesives, for producing composite materials, especially those based on carbon fiber materials or glass fiber materials, for producing moldings, or as casting compositions, especially as casting compositions for embedding, attaching or consolidating moldings. These and the observations below apply both to the 1-pack and the 2-pack systems; preferred systems, for all of the stated utilities, are the 2-pack systems.

Coating compositions include, for example, paints. With the compositions of the invention (1-pack or 2-pack) it is possible in particular to obtain scratch-resistant protective paint coatings on any desired substrates, composed of metal, plastic or woodbase materials, for example.

Since the reactivity of the epoxy resin compositions of the invention is comparatively high, curing can be effected at low temperatures, as for example in the range from 0 to 50° C. and more particularly in the range from 5 to 35° C. This makes the epoxy resin compositions of the invention especially suitable for the coating of substrates of very large surface area, which cannot be heated, or can be heated only with difficulty, to temperatures above the ambient temperature. This includes in particular the coating of floors, particularly in highly trafficked areas, as for example for the coating of traffic areas in public buildings or squares, or for the coating of parking areas and access points of parking areas. Particularly included here as well is the coating of large-surface-area metal components and metal constructions, such as in or on buildings or boats (marine coating), for example.

The compositions are also suitable as insulating coatings in electronic applications, as an insulating coating for wires and cables, for example. Their use for producing photoresists may also be mentioned. They are especially suitable, too, as refinish paint material, in connection, for example, with the repair of pipes without pipe disassembly (cure in place pipe (CIPP) rehabilitation). They are suitable as well for the sealing and coating of floors.

Adhesives include 1-pack or 2-pack structural adhesives. Structural adhesives serve for the permanent joining of shaped parts to one another. The shaped parts may be made of any desired material; materials contemplated include plastic, metal, wood, leather, ceramic, etc. The adhesives may also be hot melt adhesives, which are fluid and processable only at elevated temperature. They may also be flooring adhesives. The compositions are also suitable as adhesives for producing printed circuit boards (electronic circuits), not least by the SMT (surface mounted technology) method.

The epoxy resin compositions of the invention are especially suitable also for producing composite materials. Composite materials (or composites) join different materials, e.g., plastics and reinforcing materials (fibers, carbon fibers), to one another through the cured epoxy resin.

The compositions of the invention are suitable, for example, for producing epoxy resin-impregnated fibers or for producing preimpregnated yarns and fabrics produced from fibers, as for example for producing prepregs which are processed further into composites. Production methods for composites include the curing of preimpregnated fibers or fiber fabrics (e.g., prepregs) after storage, or else extrusion, pultrusion, winding, and resin transfer molding (RTM) and resin infusion (RI) technologies. In particular, the fibers and/or the yarns and fabrics produced from them may be impregnated with the composition of the invention and thereafter cured at an elevated temperature.

As casting compounds for embedding, attaching or consolidating moldings, the compositions are used, for example, in electronic applications. They are suitable as flip-chip underfill or as electrical casting resins for potting, casting, and (glob-top) encapsulation.

The invention relates more particularly to a method for the coating of surfaces which comprises applying an epoxy resin composition of the invention, optionally together with at least one hardener, to the surface to be coated, and curing it thereon.

In terms of the surface to be coated, the coating method of the invention is not subject to any limitations. Examples of suitable surfaces are metal surfaces, wood surfaces, glass surfaces, and plastics surfaces. A skilled worker is able, however, by means of simple preliminary tests to determine whether other surfaces are also suitable for coating in accordance with the method of the invention.

In one preferred embodiment of the invention the epoxy resin composition is used for coating a metallic surface by coil coating. By coil coating is meant the continuous coating of metal strips ("coils") with liquid coating materials. Metal strips with a thickness of 0.2 to 2 mm and a width of up to 2 m are transported at a speed of up to 200 m/min through a coil-coating line, in the course of which they are coated. For this purpose it is possible, for example, to use cold-rolled strips of soft steels or construction-grade steels, electrolytically galvanized thin sheet, hot-dip-galvanized steel strip, or strips of aluminum or aluminum alloys. Typical lines comprise a feed station, a coil store, a cleaning and pretreatment zone, a first coating station along with baking oven and downstream cooling zone, a second coating station with oven, laminating station, and cooling, and also a coil store and winder.

The coil coating operation typically comprises the following steps:
1. If necessary: cleaning of the metal strip to remove contamination accumulated during storage of the metal strip, and to remove temporary corrosion protection oils, by means of cleaning baths.
2. Application of a thin pretreatment layer (<1 μm) by dipping or spraying methods or by roller application. The purpose of this layer is to increase the corrosion resistance, and it serves to improve the adhesion of subsequently applied coating layers on the metal surface. Baths used for this purpose are Cr(VI)-containing, Cr(III)-containing, and also chromate-free pretreatment baths.
3. Application of a primer by, for example, a roller application method. The dry layer thickness is typically about 5-10 μm. Here, solvent-based paint systems of the invention are employed.
4. Application of one or more topcoats by, for example, a roller application method. The dry layer thickness here is about 10-50 μm. Here, again, solvent-based paint systems of the invention are generally employed, although other, conventional paint formulations may also be used.

EXAMPLES

1) Materials Used

Preparation Example 1

4-ethyl-4-methyl-5-methylene-1,3-dioxolan-2-one (compound 1)

Preparation was carried out in analogy to the procedure known from DE 3233403.

Preparation Example 2

4,4-dimethyl-5-methylene-1,3-dioxolan-2-one (compound 2)

Preparation was carried out in analogy to the procedure known from DE 3233403.

Preparation Example 3

4-methylene-1,3-dioxaspiro[4.5]decan-2-one

Preparation was carried out in analogy to the procedure known from DE 3233403.

Preparation Example 4

4-methylene-1,3-dioxolan-2-one

Prepared in analogy to the method described by F. Gagosz et al., Org. Lett. 2006, 8, 515-518, by successive reaction of propargyl alcohol with sodium hydride and $Boc_2O$ and subsequent cyclization in the presence of triphenylphosphine-gold(I)-bis(trifluoromethylsulfonyl)amide $(PPh_3)AuNTf_2$.

Preparation Example 5

4-methyl-5-methylene-1,3-dioxolan-2-one

The title compound was prepared by reacting 1-butyn-3-ol with $CO_2$ in the presence of CuI on polystyrene-$NMe_2$ (8 mol %, 140 bar, 40° C. 24 h) in analogy to Eur. J. Org. Chem. 2008, 2309-2312.

Preparation Example 6

4,4-dimethyl-5-(3-methoxy-1-ethylene)-1,3-dioxolan-2-one

Prepared starting from 1-methoxy-4-methyl-2-butyn-4-ol with $CO_2$ in the presence of silver(I)acetate (10 mol %) and DBU (1 mol) at 10 bar, 25° C. for 5 h in analogy to the method specified in Eur. J. Org. Chem. 2007, 2604-2607.

The following substances were used as epoxy resins of component A:

Epoxy resin 1: aromatic epoxy resin based on bisphenol A, having an epoxide equivalent of 175-185 g/eq and a viscosity at 25° C. of 8-10 PA s (Epilox A 18-00).

Epoxy resin 2: cycloaliphatic epoxy resin in the form of a hydrogenated glycidyl ether based on bisphenol A, having an epoxide equivalent of 205-235 g/eq and a viscosity at 25° C. in the region of 1.5-3.0 Pa s (Epilox P 22-00).

Epoxy resin 3: aromatic epoxy resin based on bisphenol A, having an epoxide equivalent of 182-192 g/eq and a viscosity at 25° C. in the region of 10-14 Pa s (Epilox A 19-03).

Epoxy resin 4: aromatic epoxy resin based on bisphenol F, having an epoxide equivalent of 165-173 g/eq and a viscosity at 25° C. in the region of 2.5-4.5 Pa s (Epilox F 17-00).

The following substances were used as conventional diluents:

HDDGE: Hexanediol diglycidyl ether
BDGGE: Butanediol diglycidyl ether
propylene carbonate The following substances were used as hardeners:

Hardener H1: Isophoronediamine (IPDA)
Hardener H2: Polyetheramine D230 (BASF SE)
Hardener H3: Polyamide resin based on a dimer fatty acid and polyamine (amine number 340-410 mg KOH/g: Versamid 140 from Cognis)
Hardener H4: Diaminomethylcyclohexane
Hardener H5: Unmodified, liquid araliphatic polyamine (Epilox MXDA)
Hardener H6: Hydrophobic polyamine based on polytetrahydrofuran (polyTHF amine 350)
Hardener H7: Polyaminoamide hardener (Ancamide 2353)

2) Performance Testing

2.1) Determination of Viscosity

The viscosities of the compositions of the invention were determined at 23° C. by means of a cone-and-plate viscometer from Epprecht Instruments (Basle, Switzerland).

2.2) Determination of Gel Time

The gel time was determined by mixing from 20 to 30 ml of the epoxy resin composition under analysis in a 100 ml glass beaker. A steel wire having a diameter of 1.5 mm was then immersed into the formulation and moved back and forth mechanically with a frequency of 40 $min^{-1}$. At the time of curing of the resin, the glass beaker is lifted up by this motion. The time from the moment of mixing to the curing time thus determined is taken as the gel time.

2.3) Determination of Tack-Free Time/Through-Drying

The tack-free time was determined by means of a sand application instrument which has one or more closeable funnels for holding fine sand (grain size up to 600 μm) and has two narrow metal pressure rollers mounted at the outlet of each funnel, the funnel being movable horizontally at constant speed in the running direction of the pressure rollers.

For the determination of the tack-free time/through-drying, each epoxy resin composition is applied using a coating bar to a glass plate (38*7 cm). Immediately thereafter, the sand-filled funnel and the pressure rollers are mounted onto the glass plate surface coated with the epoxy resin composition in such a way that the pressure rollers are pointing in the lengthwise direction of the coated glass plate. The closure at the outlet of the funnel is opened, and the funnel is moved horizontally at constant speed (1 cm/h or 10 cm/h) in the direction of the pressure rollers. This forms a sand track and two pressure tracks, parallel to the sand track, in the coating material surface. The measurement temperature is around 23+/−2° C. and the atmospheric humidity around 50%. After one complete passage, the excess sand is removed with a brush and the lengths of the pressure tracks and the length of the sand track are ascertained. The tack-free time is obtained by multiplying the length of the sand track by the speed of the funnel, and the through-drying time is obtained by multiplying the length of the pressure track by the speed of the funnel.

The following investigations were also carried out:

Hardness PH (pendulum hardness on galvanized steel in accordance with DIN EN ISO 1522/KÖNIG method);

Flexibility EC (cupping test as per DIN EN ISO 1520);

(Dry) adhesion (cross-cut testing with adhesive-tape removal, as per DIN EN ISO 2409 GT-TR);

Solvent resistance, method based on DIN 68860/68861 and DIN EN 12720.

Investigation 1: Effect of Diluents on the Gel Time of Aromatic Epoxy Resin 1:

Epoxy resin 1 was mixed with the amounts of diluent and hardener stated in table 1 and then the gel time was ascertained as described under 2.2. The amounts of the components indicated in table 1 are given in parts by weight. The gel times are indicated in table 1:

TABLE 1

Gel time of aromatic epoxy resin 1 as a function of diluent added

| # | Epoxy resin 1 [pbw] | Diluent Type | Diluent [pbw] | Hardener Type | Hardener [pbw] | Gel time [min] |
|---|---|---|---|---|---|---|
| 1[2] | 10 | — | 0 | H1 | 2.33 | 263 |
| 2[2] | 9.9 | BDDGE | 0.1 | H1 | 2.34 | 273 |
| 3[2] | 9.9 | HDDGE | 0.1 | H1 | 2.34 | 273 |
| 4[2] | 9.9 | PC | 0.1 | H1 | 2.39 | 270 |
| 5[1] | 9.9 | compound 2 | 0.1 | H1 | 2.44 | 218 |
| 6[2] | 9.5 | BDDGE | 0.5 | H1 | 2.37 | 281 |
| 7[2] | 9.5 | HDDGE | 0.5 | H1 | 2.36 | 285 |
| 8[2] | 9.5 | PC | 0.5 | H1 | 2.63 | 255 |
| 9[1] | 9.5 | compound 2 | 0.5 | H1 | 2.86 | 131 |
| 10[2] | 9.0 | BDDGE | 1.0 | H1 | 2.41 | 297 |
| 11[2] | 9.0 | HDDGE | 1.0 | H1 | 2.38 | 270 |
| 12[2] | 9.0 | PC | 1.0 | H1 | 2.92 | 250 |
| 13[1] | 9.0 | compound 2 | 1.0 | H1 | 3.4 | 70 |
| 14[2] | 8.0 | BDDGE | 2.0 | H1 | 2.50 | 338 |
| 15[2] | 8.0 | HDDGE | 2.0 | H1 | 2.43 | 339 |
| 16[2] | 8.0 | PC | 2.0 | H1 | 3.52 | 265 |
| 17[1] | 8.0 | compound 2 | 2.0 | H1 | 4.50 | 10 |
| 18[2] | 7.0 | BDDGE | 3.0 | H1 | 2.58 | 426 |
| 19[2] | 7.0 | HDDGE | 3.0 | H1 | 2.48 | 442 |
| 20[2] | 7.0 | PC | 3.0 | H1 | 4.11 | 259 |
| 21[1] | 7.0 | compound 2 | 3.0 | H1 | 5.60 | 4 |
| 22[2] | 10 | — | 0 | H4 | 1.80 | 392 |
| 23[2] | 9.9 | BDDGE | 0.1 | H4 | 1.81 | 433 |
| 24[2] | 9.9 | HDDGE | 0.1 | H4 | 1.81 | 391 |
| 25[2] | 9.9 | PC | 0.1 | H4 | 1.85 | 417 |
| 26[1] | 9.9 | compound 2 | 0.1 | H4 | 1.83 | 299 |
| 27[2] | 9.5 | BDDGE | 0.5 | H4 | 1.83 | 450 |
| 28[2] | 9.5 | HDDGE | 0.5 | H4 | 1.82 | 406 |
| 29[2] | 9.5 | PC | 0.5 | H4 | 2.03 | 429 |
| 30[1] | 9.5 | compound 2 | 0.5 | H4 | 1.96 | 121 |
| 31[2] | 9.0 | BDDGE | 1.0 | H4 | 1.86 | 461 |
| 32[2] | 9.0 | HDDGE | 1.0 | H4 | 1.84 | 430 |
| 33[2] | 9.0 | PC | 1.0 | H4 | 2.25 | 435 |
| 34[1] | 9.0 | compound 2 | 1.0 | H4 | 2.12 | 24 |
| 35[2] | 8.0 | BDDGE | 2.0 | H4 | 1.92 | 506 |
| 36[2] | 8.0 | HDDGE | 2.0 | H4 | 1.87 | 540 |
| 37[2] | 8.0 | PC | 2.0 | H4 | 2.70 | 516 |
| 38[1] | 8.0 | compound 2 | 2.0 | H4 | 2.44 | 7 |
| 39[2] | 7.0 | BDDGE | 3.0 | H4 | 1.97 | 574 |
| 40[2] | 7.0 | HDDGE | 3.0 | H4 | 1.90 | 639 |
| 41[2] | 7.0 | PC | 3.0 | H4 | 3.15 | 616 |
| 42[1] | 7.0 | compound 2 | 3.0 | H4 | 2.76 | 5 |
| 43[2] | 10 | — | 0 | H2 | 3.23 | 1036 |
| 44[2] | 9.9 | BDDGE | 0.1 | H2 | 3.24 | 979 |
| 45[1] | 9.9 | compound 2 | 0.1 | H2 | 3.28 | 908 |
| 46[2] | 9.5 | BDDGE | 0.5 | H2 | 3.28 | 1021 |
| 47[1] | 9.5 | compound 2 | 0.5 | H2 | 3.51 | 669 |
| 48[2] | 9.0 | BDDGE | 1.0 | H2 | 3.33 | 1146 |
| 49[1] | 9.0 | compound 2 | 1.0 | H2 | 3.80 | 509 |
| 50[2] | 8.0 | BDDGE | 2.0 | H2 | 3.44 | 1205 |
| 51[1] | 8.0 | compound 2 | 2.0 | H2 | 4.38 | 365 |
| 52[2] | 10 | — | 0 | H3 | 6.67 | 318 |
| 53[2] | 9.9 | BDDGE | 0.1 | H3 | 6.69 | 303 |
| 54[1] | 9.9 | compound 2 | 0.1 | H3 | 6.71 | 310 |
| 55[2] | 9.5 | BDDGE | 0.5 | H3 | 6.78 | 321 |
| 56[1] | 9.5 | compound 2 | 0.5 | H3 | 6.90 | 271 |
| 57[2] | 9.0 | BDDGE | 1.0 | H3 | 6.88 | 339 |
| 58[1] | 9.0 | compound 2 | 1.0 | H3 | 7.12 | 255 |
| 59[2] | 8.0 | BDDGE | 2.0 | H3 | 7.10 | 383 |
| 60[1] | 8.0 | compound 2 | 2.0 | H3 | 7.58 | 185 |

[1] inventive
[2] comparative
PC = propylene carbonate

Investigation 2: Effect of Diluents on the Gel Time of Cycloaliphatic Epoxy Resin 2:

Epoxy resin 2 was mixed with the amounts of diluent and hardener stated in table 2 and then the gel time was ascertained as described under 2.2. The amounts of the components indicated in table 2 are given in parts by weight. The gel times are indicated in table 2.

TABLE 2

Gel time of cycloaliphatic epoxy resin 2 as a function of the diluent added

| # | Epoxy resin 2 [pbw] | Diluent Type | Diluent [pbw] | Hardener Type | Hardener [pbw] | Gel time [min] |
|---|---|---|---|---|---|---|
| 61[2] | 10 | — | 0 | H1 | 1.91 | 624 |
| 62[2] | 9.9 | BDDGE | 0.1 | H1 | 1.92 | 578 |
| 63[2] | 9.9 | HDDGE | 0.1 | H1 | 1.92 | 562 |
| 64[2] | 9.9 | PC | 0.1 | H1 | 1.98 | 589 |
| 65[1] | 9.9 | compound 2 | 0.1 | H1 | 1.96 | 560 |
| 66[2] | 9.5 | BDDGE | 0.5 | H1 | 1.97 | 665 |
| 67[2] | 9.5 | HDDGE | 0.5 | H1 | 1.96 | 609 |
| 68[2] | 9.5 | PC | 0.5 | H1 | 2.23 | 565 |
| 69[1] | 9.5 | compound 2 | 0.5 | H1 | 2.15 | 344 |
| 70[2] | 9.0 | BDDGE | 1.0 | H1 | 2.04 | 800 |
| 71[2] | 9.0 | HDDGE | 1.0 | H1 | 2.00 | 659 |
| 72[2] | 9.0 | PC | 1.0 | H1 | 2.55 | 520 |
| 73[1] | 9.0 | compound 2 | 1.0 | H1 | 2.38 | 175 |
| 74[2] | 8.0 | BDDGE | 2.0 | H1 | 2.16 | 803 |
| 75[2] | 8.0 | HDDGE | 2.0 | H1 | 2.10 | 710 |
| 76[2] | 8.0 | PC | 2.0 | H1 | 3.18 | 503 |
| 77[1] | 8.0 | compound 2 | 2.0 | H1 | 2.85 | 23 |
| 78[2] | 7.0 | BDDGE | 3.0 | H1 | 2.28 | 878 |
| 79[2] | 7.0 | HDDGE | 3.0 | H1 | 2.19 | 845 |
| 80[2] | 7.0 | PC | 3.0 | H1 | 3.82 | 519 |
| 81[1] | 7.0 | compound 2 | 3.0 | H1 | 3.31 | 8 |
| 82[2] | 10 | — | 0 | H4 | 1.46 | 759 |
| 83[2] | 9.9 | BDDGE | 0.1 | H4 | 1.47 | 870 |
| 84[2] | 9.9 | HDDGE | 0.1 | H4 | 1.46 | 883 |
| 85[2] | 9.9 | PC | 0.1 | H4 | 1.51 | 842 |
| 86[1] | 9.9 | compound 2 | 0.1 | H4 | 1.49 | 649 |
| 87[2] | 9.5 | BDDGE | 0.5 | H4 | 1.50 | 911 |
| 88[2] | 9.5 | HDDGE | 0.5 | H4 | 1.49 | 897 |
| 89[2] | 9.5 | PC | 0.5 | H4 | 1.70 | 863 |
| 90[1] | 9.5 | compound 2 | 0.5 | H4 | 1.63 | 330 |
| 91[2] | 9.0 | BDDGE | 1.0 | H4 | 1.55 | 940 |
| 92[2] | 9.0 | HDDGE | 1.0 | H4 | 1.53 | 972 |
| 93[2] | 9.0 | PC | 1.0 | H4 | 1.94 | 907 |
| 94[1] | 9.0 | compound 2 | 1.0 | H4 | 1.81 | 110 |
| 95[2] | 8.0 | BDDGE | 2.0 | H4 | 1.64 | 1183 |
| 96[2] | 8.0 | HDDGE | 2.0 | H4 | 1.59 | 1142 |
| 97[2] | 8.0 | PC | 2.0 | H4 | 2.42 | 1004 |
| 98[1] | 8.0 | compound 2 | 2.0 | H4 | 2.17 | 17 |
| 99[2] | 7.0 | BDDGE | 3.0 | H4 | 1.73 | 1206 |
| 100[2] | 7.0 | HDDGE | 3.0 | H4 | 1.66 | 1269 |
| 101[2] | 7.0 | PC | 3.0 | H4 | 2.91 | 1142 |
| 102[1] | 7.0 | compound 2 | 3.0 | H4 | 2.52 | 5 |

[1] inventive
[2] comparative
PC = propylene carbonate

Investigation 3: Effect of Diluents on the Viscosity of Epoxy Resin 2

Epoxy resin 2 was mixed, in the proportions indicated in table 3, with butanediol diglycidyl ether or with the compound 2. The viscosity was then determined as described under 2.1. The results are compiled in table 3.

TABLE 3

Viscosity of epoxy resin compositions of epoxy resin 2 without hardener

| Constituent | V1[2] | V2[2] | V3[2] | 1[1] | 2[1] | 3[1] |
|---|---|---|---|---|---|---|
| Epoxy resin 2 [pbw] | 10 | 9 | 8 | 9.9 | 9.5 | 9 |
| BDDGE [pbw] | 0 | 1 | 2 | 0 | 0 | 0 |
| Compound 2 [pbw] | 0 | 0 | 0 | 0.1 | 0.5 | 1 |
| Viscosity at 23° C. [mPa·s] | 2950 | 950 | 420 | 2440 | 1360 | 710 |

[1] inventive
[2] comparative

Investigation 4: Effect of Reactive Diluents on the Tack-Free Time and Pendulum Damping Epoxy resins 2 and 3 were mixed in the proportions indicated in tables 4 and 5 with hardeners, diluents, and the compounds 1 or 2. The tack-free time and pendulum hardness investigations then took place. The results are compiled in table 4 for epoxy resin 2 and in table 5 for epoxy resins 3 and 4.

TABLE 4

Tack-free times and pendulum damping of a cured epoxy resin composition based on epoxy resin 2:

| Constituent | Epoxy resin composition | | | | | |
|---|---|---|---|---|---|---|
| | V1[2)] | V2[2)] | V3[2)] | 1[1)] | 2[1)] | 3[1)] |
| Epoxy resin 2 [pbw] | 10 | 9 | 8 | 9.9 | 9.5 | 9 |
| BDDGE [pbw] | 0 | 1 | 2 | 0 | 0 | 0 |
| Compound 2 [pbw] | 0 | 0 | 0 | 0.1 | 0.5 | 1 |
| Hardener H1 [pbw] | 1.91 | 2.04 | 2.16 | 1.96 | 2.15 | 2.38 |
| Tack-free time [min] | 450 | 870 | >1410[3)] | 450 | 150 | 120 |
| Through-curing [min] | 1110 | 1380 | >1410[3)] | 990 | 900 | 630 |
| Pendulum damping | | | | | | |
| [s] | 233.8 | 246.4 | 191.8 | 245 | 236.6 | 204.4 |
| [deflections] | 167 | 176 | 137 | 175 | 169 | 146 |

[1)] inventive
[2)] comparative
[3)] above the measurement limit of 1410 min

TABLE 5

Tack-free times and pendulum damping of a cured epoxy resin composition based on the epoxy resins 3 and 4:

| Constituent | Epoxy resin composition | | | | | |
|---|---|---|---|---|---|---|
| | V4[2)] | 4[1)] | 5[1)] | 6[1)] | V5[2)] | 7[1)] |
| Epoxy resin 3 [pbw] | 10 | 9 | 8 | 8 | 0 | 0 |
| Epoxy resin 4 [pbw] | 0 | 0 | 0 | 0 | 10 | 9 |
| BDDGE [pbw] | 0 | 0 | 1 | 0 | 0 | 0 |
| HDDGE [pbw] | 0 | 0 | 0 | 1 | 0 | 0 |
| Compound 1 [pbw] | 0 | 1 | 1 | 1 | 0 | 1 |
| Hardener H5 [pbw] | 1.87 | 2.2 | 2.2 | 2.2 | 2 | 2.3 |
| Tack-free time [min] | 300 | 120 | 150 | 150 | n.d. | n.d. |
| Through-curing [min] | 420 | 210 | 270 | 270 | n.d. | n.d. |
| Pendulum damping [s] | 242.2 | 229.6 | 225.4 | 229.6 | n.d. | n.d. |
| [Deflections] | 173 | 164 | 161 | 164 | n.d. | n.d. |

[1)] inventive
[2)] comparative
[3)] above the measurement limit of 1410 min
n.d. not determined Investigation 5: Effect of Hardeners on the Tack-Free Time and Pendulum Damping Epoxy resins 1 and 2, respectively, were mixed in the proportions indicated in Tables 6 and 7 with hardener H5 or hardener H6 and with the compound 1. Epoxy resins 3 and 4, respectively, were mixed in the proportions indicated in Table 8 with the hardeners H5 and H7 and also with mixtures of the hardeners H5 and H7. The tack-free time and pendulum hardness investigations then took place. The results are compiled in Tables 6 to 8.

TABLE 6

Tack-free times and pendulum damping of a cured epoxy resin composition based on epoxy resin 1:

| Constituent | Epoxy resin composition | | | | | | | |
|---|---|---|---|---|---|---|---|---|
| | V1[2)] | 1[1)] | 2[1)] | 3[1)] | V2[2)] | 4[1)] | 5[1)] | 6[1)] |
| Epoxy resin 1 [pbw] | 10 | 9.5 | 9 | 8.5 | 10 | 9.5 | 9 | 8.5 |
| Hardener H5 [pbw] | 1.91 | 2.05 | 2.2 | 2.34 | 0 | 0 | 0 | 0 |
| Hardener H6 [pbw] | 0 | 0 | 0 | 0 | 5 | 4.41 | 4.78 | 5.15 |
| Compound 1 [pbw] | 0 | 0.5 | 1 | 1.5 | 0 | 0.5 | 1 | 1.5 |
| Tack-free time [min] | 255 | 180 | 135 | 90 | 960 | 675 | 600 | 570 |
| Through-curing [min] | 375 | 270 | 195 | 165 | 1620 | 900 | 690 | 600 |
| Pendulum damping [s] | 238 | 231 | 235.2 | 239.4 | 11.2 | 21 | 105 | 137.2 |
| [Deflections] | 170 | 165 | 167 | 171 | 8 | 15 | 75 | 98 |

[1)] inventive
[2)] comparative

TABLE 7

Tack-free times and pendulum damping of a cured epoxy resin composition based on epoxy resin 2:

| Constituent | V3[2] | 7[1] | 8[1] | 9[1] | V4[2] | 10[1] | 11[1] | 12[1] |
|---|---|---|---|---|---|---|---|---|
| Epoxy resin 2 [pbw] | 10 | 9.5 | 9 | 8.5 | 10 | 9.5 | 9 | 8.5 |
| Hardener H5 [pbw] | 1.55 | 1.71 | 1.87 | 2.03 | 0 | 0 | 0 | 0 |
| Hardener H6 [pbw] | 0 | 0 | 0 | 0 | 4.05 | 4.41 | 4.78 | 5.15 |
| Compound 1 [pbw] | 0 | 0.5 | 1 | 1.5 | 0 | 0.5 | 1 | 1.5 |
| Tack-free time [min] | 285 | 240 | 210 | 90 | 2220 | 1800 | 1605 | 1545 |
| Through-curing [min] | 660 | 540 | 450 | 360 | 2475 | 2370 | 1860 | 1650 |
| Pendulum damping [s] | 203 | 217 | 222.6 | 232.4 | 9.8 | 12.6 | 11.2 | 7 |
| [Deflections] | 145 | 155 | 159 | 166 | 7 | 9 | 8 | 5 |

[1] inventive
[2] comparative

TABLE 8

Tack-free times and pendulum damping of a cured epoxy resin composition based on epoxy resin 3 or 4:

| Constituent | V5[2] | 13[1] | V6[2] | 14[1] | V7[2] | 15[1] | V8[2] | 18[1] |
|---|---|---|---|---|---|---|---|---|
| Epoxy resin 3 [pbw] | 10 | 9 | 10 | 9 | 0 | 0 | 0 | 0 |
| Epoxy resin 4 [pbw] | 0 | 0 | 0 | 0 | 10 | 9 | 10 | 9 |
| Hardener H5 [pbw] | 1.87 | 2.2 | 1.37 | 1.8 | 2 | 2.3 | 1.4 | 1.9 |
| Hardener H7 [pbw] | 0 | 0 | 1.88 | 1.88 | 0 | 0 | 2.02 | 2.02 |
| Compound 1 [pbw] | 0 | 1 | 0 | 1 | 0 | 1 | 0 | 1 |
| Tack-free time [min] | 300 | 120 | 300 | 135 | 270 | 110 | 265 | 135 |
| Through-curing [min] | 420 | 210 | 360 | 270 | 390 | 240 | 405 | 285 |
| Pendulum damping [s] | 242.2 | 229.6 | 201.6 | 212.8 | 218.4 | 226.8 | 184.8 | 207.2 |
| [Deflections] | 173 | 164 | n.d. | n.d. | 156 | 162 | n.d. | n.d. |

[1] inventive
[2] comparative
n.d.: not determined

Investigation 6: Effect of the Time of Addition of Hardeners on Tack-Free Time and Pendulum Damping Epoxy resins 3 and 4, respectively, were mixed in the proportions indicated in table 9 with compound 1. A mixture as described in table 9 was added to the resins only after 24 h at room temperature. After 1 week of curing at room temperature, the tack-free time determination and pendulum hardness investigations took place. The results are compiled in table 9.

TABLE 9

Tack-free times and pendulum damping of a cured epoxy resin composition based on epoxy resins 3 and 4:

| Constituent | V1[2] | 1[1] | V2[2] | 2[1] | V3[2] | 3[1] |
|---|---|---|---|---|---|---|
| Epoxy resin 3 [pbw] | 9 | 8 | 0 | 0 | 9 | 0 |
| Epoxy resin 4 [pbw] | 0 | 0 | 9 | 8 | 0 | 9 |
| Composition 1 [GT] | 0 | 1 | 0 | 1 | 0 | 0 |
| Addition of the following compounds after 24 h at RT | | | | | | |
| Hardener H5 [pbw] | 1.87 | 2.2 | 2 | 2.3 | 2.2 | 2 |
| Epoxy resin 3 [pbw] | 1 | 1 | 0 | 0 | 0 | 0 |
| Epoxy resin 4 [pbw] | 0 | 0 | 1 | 1 | 0 | 0 |
| Compound 1 [pbw] | 0 | 0 | 0 | 0 | 1 | 1 |
| Tack-free time [min] | 120 | 90 | 90 | 90 | 90 | 90 |
| Through-curing [min] | 240 | 180 | 240 | 150 | 180 | 210 |
| Pendulum damping [s] | 233.8 | 238 | 231 | 233.8 | 238 | 231 |
| [Deflections] | 167 | 170 | 165 | 167 | 170 | 165 |

[1] inventive
[2] comparative

Investigation 7: Curing at Low Temperatures (10° C.)

Epoxy resin 3 was mixed in the proportions indicated in table 10 with the hardeners H1 and H2, respectively, and with the compound 1 at 10° C. and homogenized for 1 min at 2000 rpm by using a high-speed mixer. The viscosity of the mixture was determined every 30 sec at 10° C. over a period of up to 6 h. The viscosity was determined by using a stress-controlled rheometer (MCR 301, Anton Paar) equipped with plate and plate geometry (diameter 25 mm, gap 1 mm) with 100 sec$^{-1}$ shear rate. The results are compiled in table 10.

TABLE 10

| | Curing at a temperature of 10° C.: | | | | | | | |
|---|---|---|---|---|---|---|---|---|
| | Epoxy resin composition | | | | | | | |
| Constituent | V1[2)] | 1[1)] | 2[1)] | V2[2)] | 3[1)] | 4[1)] | 5[1)] | 6[1)] |
| Epoxy resin 3 [pbw] | 100 | 100 | 100 | 100 | 100 | 100 | 100 | 100 |
| Hardener H1 [pbw] | 23.6 | 30.2 | 36.7 | 0 | 0 | 0 | 0 | 0 |
| Hardener H5 [pbw] | 0 | 0 | 0 | 18.7 | 20 | 18.7 | 21.3 | 18.7 |
| DMP 30[3)] accelerator [pbw] | 0 | 0 | 0 | 5 | 0 | 0 | 0 | 0 |
| Compound 1 [pbw] | 0 | 10 | 20 | 0 | 2.48 | 2.48 | 5 | 5 |
| Viscosity: | | | | | | | | |
| >100 Pas [min] | 267 | 83 | 52 | n.d. | n.d. | n.d. | n.d. | n.d. |
| >300 Pas [min] | n.d. | n.d. | n.d. | 401 | 321 | 295 | 213 | 185 |

[1)]inventive
[2)]comparative
[3)]2,4,6-trisdimethylaminomethylphenol
n.d.: not determined

The invention claimed is:

1. An epoxy resin formulation comprising:
   a) at least one epoxy resin as component A and
   b) at least one compound of the following formula I as component B

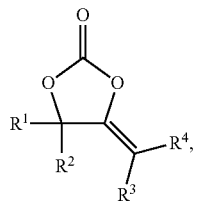

(I)

wherein
   each $R^1$ and $R^2$, independently, is hydrogen, $C_1$-$C_6$-alkyl, $C_1$-$C_4$-alkoxy-$C_1$-$C_4$-alkyl, $C_5$-$C_6$-cycloalkyl, phenyl, phenyl-$C_1$-$C_4$-alkyl, $C_2$-$C_6$-alkenyl or $C_2$-$C_6$-alkynyl, or $R^1$ and $R^2$ together are a $C_3$-$C_{11}$-alkylene group; and
   each $R^3$ and $R^4$, independently, is hydrogen, $C_1$-$C_6$-alkyl, $C_1$-$C_4$-alkoxy-$C_1$-$C_4$-alkyl, $C_5$-$C_6$-cycloalkyl, phenyl, phenyl-$C_1$-$C_4$-alkyl, $C_2$-$C_6$-alkenyl or $C_2$-$C_6$-alkynyl, or $R^3$ and $R^4$ together are a $C_4$-$C_6$-alkylene group,
   or a mixture thereof.

2. The formulation according to claim 1, in which one of $R^1$, $R^2$, $R^3$, and $R^4$ is different from hydrogen.

3. The formulation according to claim 1, in which $R^1$ is selected from the group consisting of hydrogen and $C_1$-$C_4$-alkyl, and $R^2$ is selected from the group consisting of $C_1$-$C_6$-alkyl, $C_1$-$C_4$-alkoxy-$C_1$-$C_4$-alkyl, $C_5$-$C_6$-cycloalkyl, phenyl, phenyl-$C_1$-$C_4$-alkyl, $C_2$-$C_6$-alkenyl and $C_2$-$C_6$-alkynyl, or $R^1$ and $R^2$ together are a $C_4$-$C_6$-alkylene group.

4. The formulation according claim 1, in which $R^1$ is selected from the group consisting of hydrogen and $C_1$-$C_4$-alkyl, and $R^2$ is selected from the group consisting of $C_1$-$C_4$-alkyl and $C_1$-$C_4$-alkoxy-$C_1$-$C_4$-alkyl or $R^1$ and $R^2$ together are a $C_4$-$C_6$-alkylene group.

5. The formulation according claim 1, in which each of $R^1$ and $R^2$ is $C_1$-$C_4$-alkyl.

6. The formulation according to claim 1, in which at least one of $R^3$ or $R^4$ is hydrogen.

7. The formulation according to claim 6, in which $R^3$ and $R^4$ are hydrogen.

8. The formulation according to claim 1, in which the at least one compound of the formula I is selected from the group consisting of:
   4,4-diethyl-5-methylene-1,3-dioxolan-2-one,
   4,4-dimethyl-5-methylene-1,3-dioxolan-2-one,
   4-ethyl-5-methylene-1,3-dioxolan-2-one,
   4-ethyl-4-methyl-5-methylene-1,3-dioxolan-2-one,
   4-isopropyl-5-methylene-1,3-dioxolan-2-one,
   4-isopropyl-4-methyl-5-methylene-1,3-dioxolan-2-one,
   4-methylene-1,3-dioxaspiro[4.5]decan-2-one,
   4-phenyl-4-methyl-5-methylene-1,3-dioxolan-2-one,
   4-n-propyl-5-methylene-1,3-dioxolan-2-one, and
   4-n-propyl-4-methyl-5-methylene-1,3-dioxolan-2-one.

9. The formulation according to claim 1, further comprising at least one conventional reactive diluent selected from the group consisting of a glycidyl ether of an aliphatic polyol having 2 to 8 C atoms, a glycidyl ether of an unsaturated polyol having 2 to 8 C atoms, a glycidyl ether of a cycloaliphatic polyol having 3 to 8 C atoms, and a glycidyl ether of an aromatic polyol having 6 to 8 C atoms.

10. The formulation according to claim 1, comprising from 0.1% to 50% by weight of the at least one compound of the formula I, based on the total weight of the composition.

11. The formulation according to claim 1, in which the component A is at least one polyglycidyl ether of an aromatic, aliphatic or cycloaliphatic polyol.

12. The formulation according to claim 1, in which the component A comprises at least one polyglycidyl ether of an aromatic polyol.

13. The formulation according to claim 12, in which the polyglycidyl ether of an aromatic polyol is at least one selected from the group consisting of a polyglycidyl ether of bisphenol A, of bisphenol F, and of novolak.

14. The formulation according claim 1, in which the component A comprises at least one polyglycidyl ether of a cycloaliphatic polyol.

15. The formulation according to claim 14, in which the polyglycidyl ether of a cycloaliphatic polyol is at least one selected from the group consisting of a ring hydrogenation product of a polyglycidyl ether of bisphenol A, a ring hydrogenation product of a polyglycidyl ether of bisphenol F, and a ring hydrogenation product of a polyglycidyl ether of novolak.

16. A binder constituent in coating materials comprising the formulation according to claim 1.

17. A casting compound comprising an epoxy resin composition according to claim 1.

18. A composite material comprising the formulation according claim 1.

19. A structural adhesive comprising the formulation according to claim 1.

20. Impregnating fibers, comprising the formulation according to claim 1.

21. A method for curing an epoxy resin composition, comprising reacting the formulation according to claim 1 with at least one hardener.

22. A method for coating surfaces, comprising applying the formulation according to claim 1, optionally together with at least one hardener, to a surface to be coated.

* * * * *